(12) United States Patent
Rogozinski

(10) Patent No.: US 6,275,145 B1
(45) Date of Patent: Aug. 14, 2001

(54) APPARATUS TO HELP PREVENT TEMPORARY BLINDING OF DRIVERS

(76) Inventor: Joseph Rogozinski, 14 Moza Street, 52366 Ramat Gan (IL)

( * ) Notice: Subject to any disclaimer, the term of this patent is extended or adjusted under 35 U.S.C. 154(b) by 0 days.

(21) Appl. No.: 09/142,332

(22) PCT Filed: Mar. 3, 1997

(86) PCT No.: PCT/IL97/00078

§ 371 Date: Oct. 29, 1998

§ 102(e) Date: Oct. 29, 1998

(87) PCT Pub. No.: WO97/32749

PCT Pub. Date: Sep. 12, 1997

(30) Foreign Application Priority Data

Mar. 7, 1996 (IL) ........................................... 117403

(51) Int. Cl.[7] .................................................. B60Q 1/00
(52) U.S. Cl. ................. 340/425.5; 340/468; 340/457.2; 340/471; 340/472; 296/97.7
(58) Field of Search ................. 340/425.5, 468, 340/471, 457.2, 469, 472; 269/97.7; 350/97

(56) References Cited

U.S. PATENT DOCUMENTS

| | | |
|---|---|---|
| 3,000,262 | 9/1961 | Rabinow et al. ............... 359/604 |
| 3,152,216 | 10/1964 | Woodward ...................... 359/606 |
| 3,517,384 | 6/1970 | Jablonski ........................ 340/468 |
| 3,604,805 | 9/1971 | Scott .............................. 356/28 |
| 3,680,951 | 8/1972 | Jordan et al. ................... 359/606 |
| 4,078,859 | 3/1978 | Sharett .......................... 359/604 |
| 4,145,112 * | 3/1979 | Crone et al. .................... 350/103 |
| 4,734,697 | 3/1988 | Robinson et al. ............... 340/902 |
| 4,838,650 | 6/1989 | Stewart et al. ................. 359/604 |
| 4,930,870 | 6/1990 | Beach et al. ................... 359/530 |
| 4,940,274 * | 7/1990 | Ogren ............................ 296/97.7 |
| 5,064,274 | 11/1991 | Alten ............................. 359/604 |
| 5,119,067 | 6/1992 | Adell ............................. 340/468 |
| 5,212,468 | 5/1993 | Adell ............................. 340/469 |
| 5,237,306 | 8/1993 | Adell ............................. 340/469 |
| 5,347,261 | 9/1994 | Adell ............................. 340/469 |

FOREIGN PATENT DOCUMENTS

WO 95 04670   4/1994 (WO) .

OTHER PUBLICATIONS

Stimson, George W., "*Introduction to Airborne Radar*", Hughes Aircraft Company.

Wolfe, William L. et al, "*The Infrared Handbook*", Office of Naval Research, Department of the Navy, Washington, D. C. 1978.

* cited by examiner

*Primary Examiner*—Daryl Pope
(74) *Attorney, Agent, or Firm*—Weingarten, Schurgin, Gagnebin & Hayes LLP

(57) ABSTRACT

Apparatus for informing a driver of a first vehicle that his headlights are blinding the driver of another vehicle, the apparatus including a dynamic retroreflector mounted on the other vehicle and arranged such that light from the headlights of the first vehicle is reflected by the dynamic retroreflector to the eyes of the driver of the first vehicle.

31 Claims, 15 Drawing Sheets

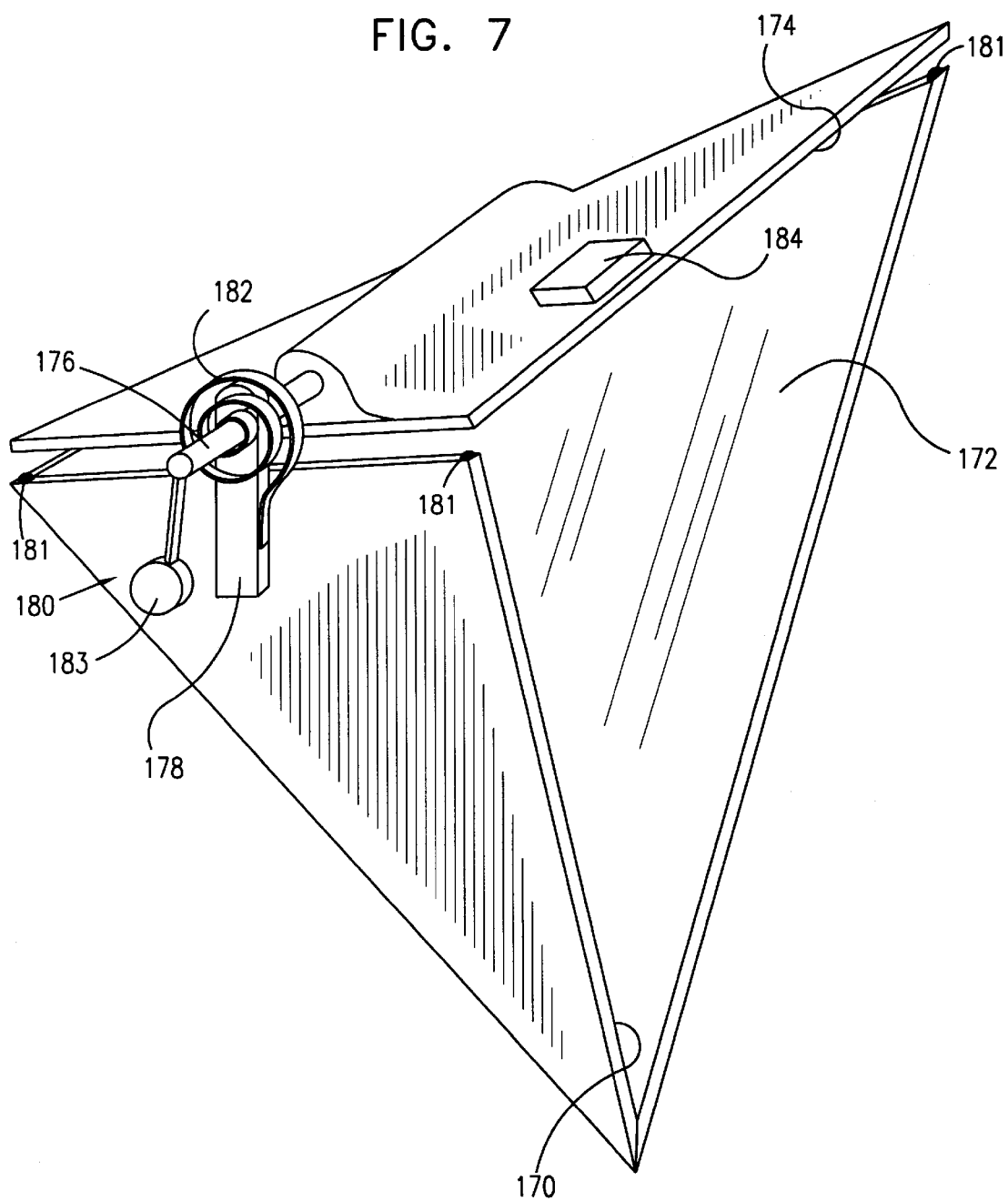

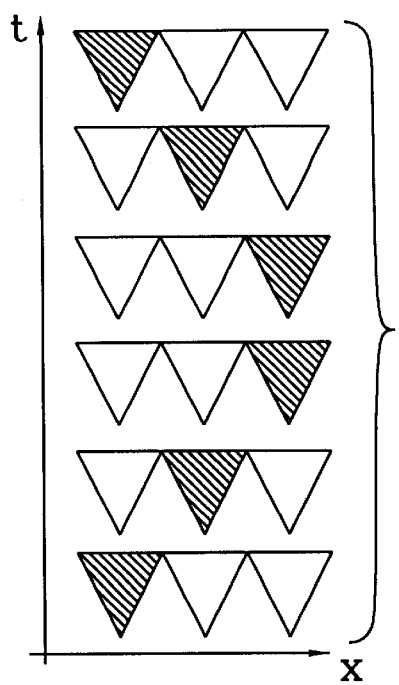
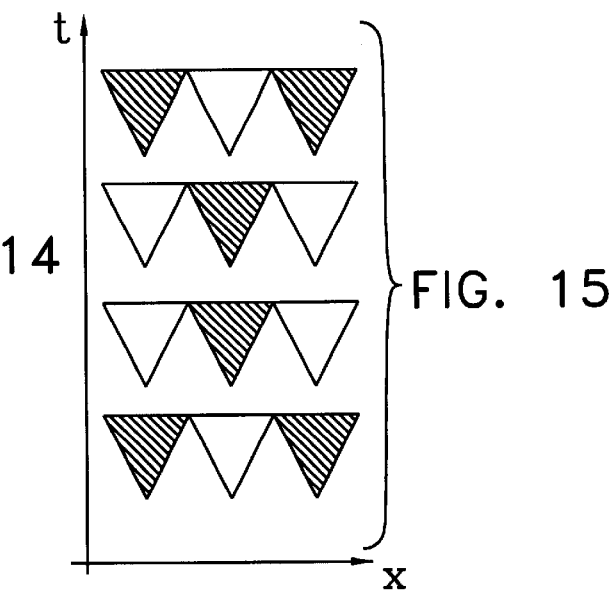
FIG. 14
FIG. 15
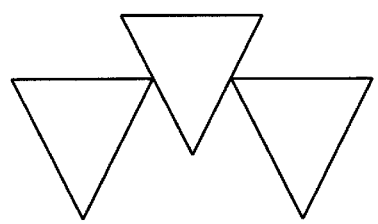
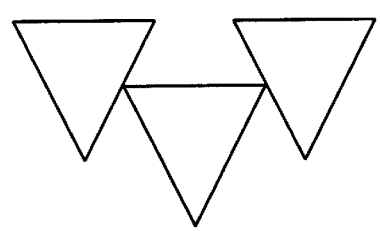
FIG. 16A
FIG. 16B
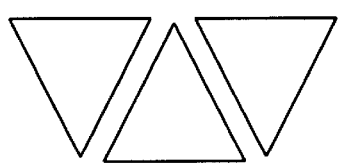
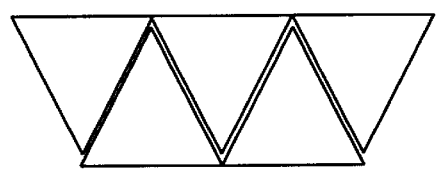
FIG. 16C
FIG. 16D

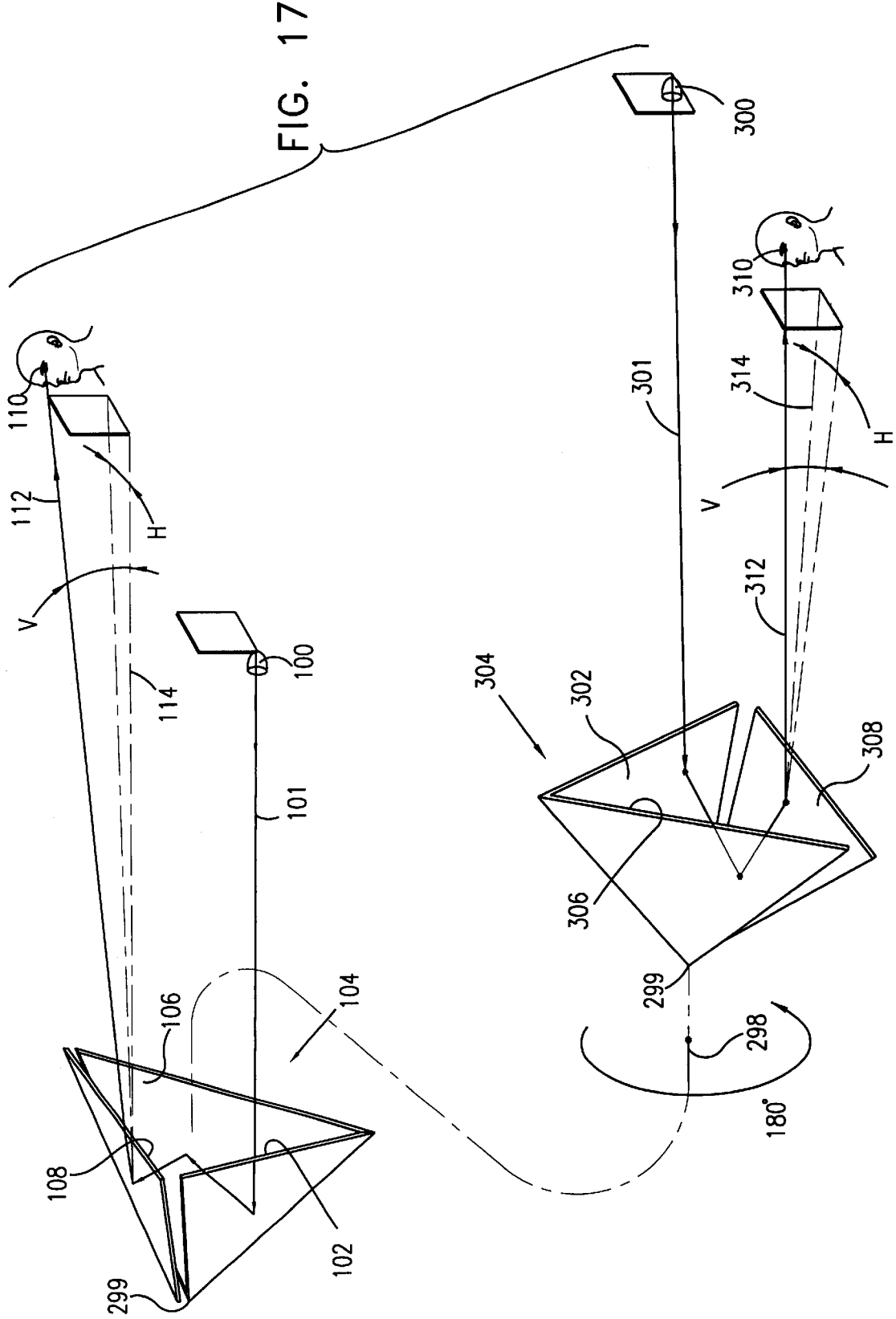

APPARATUS TO HELP PREVENT TEMPORARY BLINDING OF DRIVERS

FIELD OF THE INVENTION

The present invention relates to motor vehicle safety devices generally and more particularly to devices to help prevent blinding of drivers by headlights of adjacent vehicles.

BACKGROUND OF THE INVENTION

There are known in the parent literature various devices dealing with the prevention of blinding of drivers by headlights of adjacent vehicles. The following U.S. Patents are believed to represent the state of the art: U.S. Pat. Nos. 3,000,262; 3,152,216; 3,517,384; 3,680,951; 4,078,859; 4,734,697; 4,838,650; 5,064,274; 5,119,067; 5,212,468; 5,237,306 and 5,345,261.

SUMMARY OF THE INVENTION

The present invention seeks to provide improved apparatus to help prevent temporary blinding of drivers of motor vehicles by headlights of adjacent vehicles.

There is thus provided in accordance with a preferred embodiment of the present invention apparatus for informing a driver of a first vehicle that his headlights are blinding the driver of another vehicle, the apparatus including a dynamic retroreflector mounted on the other vehicle and arranged such that light from the headlights of the first vehicle is reflected by the dynamic retroreflector to the eyes of the driver of the first vehicle.

There is also provided in accordance with a preferred embodiment of the present invention a road vehicle assembly including apparatus for informing a driver of an other vehicle that his headlights are blinding the driver of the road vehicle, the road vehicle assembly comprising a chassis, a drive train, a dynamic retroreflector mounted on the chassis and arranged such that light from the headlights of the other vehicle is reflected by the dynamic near-retroreflector to the eyes of the driver of the other vehicle.

Preferably the dynamic retroreflector comprises at least one reflecting surface arranged to reflect received light from a headlight to a location located to the side and vertically of the headlight.

Preferably, the dynamic retroreflector includes plural reflecting surfaces which are non-fixedly mounted with respect to each other.

In accordance with a preferred embodiment of the present invention the apparatus is operative to provide a time-modulated light reflection to the driver.

Furthermore, in accordance with a preferred embodiment of the present invention the dynamic retroreflector is oriented in a first orientation for reflecting light to a vehicle with a left-hand drive.

Alternatively, the dynamic retroreflector is oriented in a second orientation for reflecting light to a vehicle with a right-hand driver.

Furthermore in accordance with a preferred embodiment of the present invention the dynamic retroreflector comprises at least one reflecting surface arranged to reflect received light from a headlight to a location located to a direction relative to the headlight.

Moreover in accordance with a preferred embodiment of the present invention the dynamic retroreflector comprises a dynamic near-retroreflector.

There is also provided in accordance with a preferred embodiment of the present invention apparatus for informing a driver of a first vehicle that his headlights are blinding the driver of another vehicle, the apparatus including a modulator-reflector mounted on the other vehicle and arranged to reflect light from the headlights of the first vehicle back towards the first vehicle in a modulated form.

Preferably, a modulated light sensor is mounted on the first vehicle and is operative to distinguish light reflected from the headlights of the first vehicle by virtue of its modulated form and to provide an output indication of receipt of light reflected from the headlights of the first vehicle and there is provided an automatic headlight brightness controller responsive to the output indication for lowering the brightness of the headlights of the first vehicle.

In accordance with a preferred embodiment of the present invention, at least one and preferably both of the modulated light sensor and the brightness controller are incorporated within a vehicle headlight.

Preferably, the modulator-reflector comprises a dynamic near-retroreflector, which may be active or passive and may include a vibrating device.

In accordance with a preferred embodiment of the invention, the modulator-reflector provides at least one and preferably both color and amplitude modulation.

In accordance with one embodiment of the present invention, the modulator-reflector comprises a passive device. Alternatively it may comprise an active device.

There is also provided in accordance with a preferred embodiment of the present invention a headlight assembly providing automatically adjusted brightness comprising a headlight housing, at least one headlight light source disposed within the housing, a light sensor disposed within the housing for sensing incoming light thereto and providing an output indication responsive thereto, and an automatic headlight brightness controller responsive to the output indication for automatically lowering the brightness of the at least one headlight light source under predetermined conditions.

Preferably, the light sensor is operative to distinguish light reflected from the at least one headlight light source from other incoming light and to provide the output indication only in response to receipt of light of at least a predetermined amplitude reflected from the at least one headlight light source.

Additionally in accordance with a preferred embodiment of the present invention, the light sensor is operative to distinguish light having a predetermined modulation from light not having a predetermined modulation.

BRIEF DESCRIPTION OF THE DRAWINGS

The present invention will be understood and appreciated more fully from the following detailed description, taken in conjunction with the drawings in which:

FIG. 7 is a pictorial illustration of a scanning near-retroreflector in accordance with another preferred embodiment of the present invention;

FIG. 14 is a simplified illustration of a series of images seen by a driver over time when his headlights are reflected by a scanning array of near-retroreflectors of the type illustrated in FIG. 13;

FIG. 15 is a simplified illustration of a series of images seen by a driver over time when his headlights are reflected by a scanning array of near-retroreflectors of the type illustrated in FIG. 12;

FIGS. 16A, 16B, 16C and 16D are illustrations of four typical arrangements of dynamic near-retroreflectors which may be employed in accordance with a preferred embodiment of the present invention;

FIG. 17 is a simplified illustration of a selectably mountable dynamic near-retroreflector useful in accordance with a preferred embodiment of the present invention in two operative orientations;

DETAILED DESCRIPTION OF PREFERRED EMBODIMENTS

Figure 1:
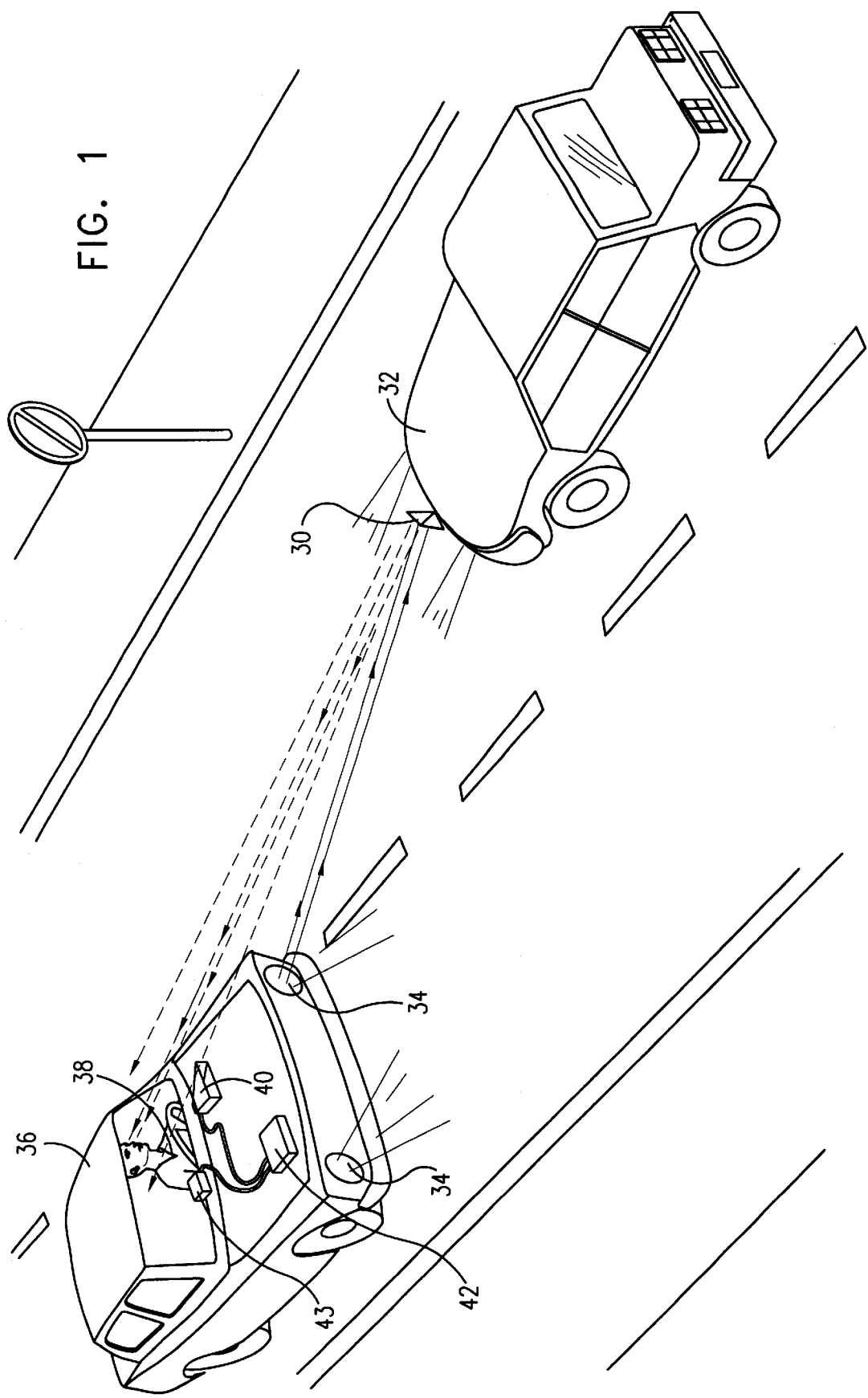
FIG. 1 is a simplified illustration of the operation of a preferred embodiment of the present invention in a situation involving mutually facing vehicles.
Figure 2:
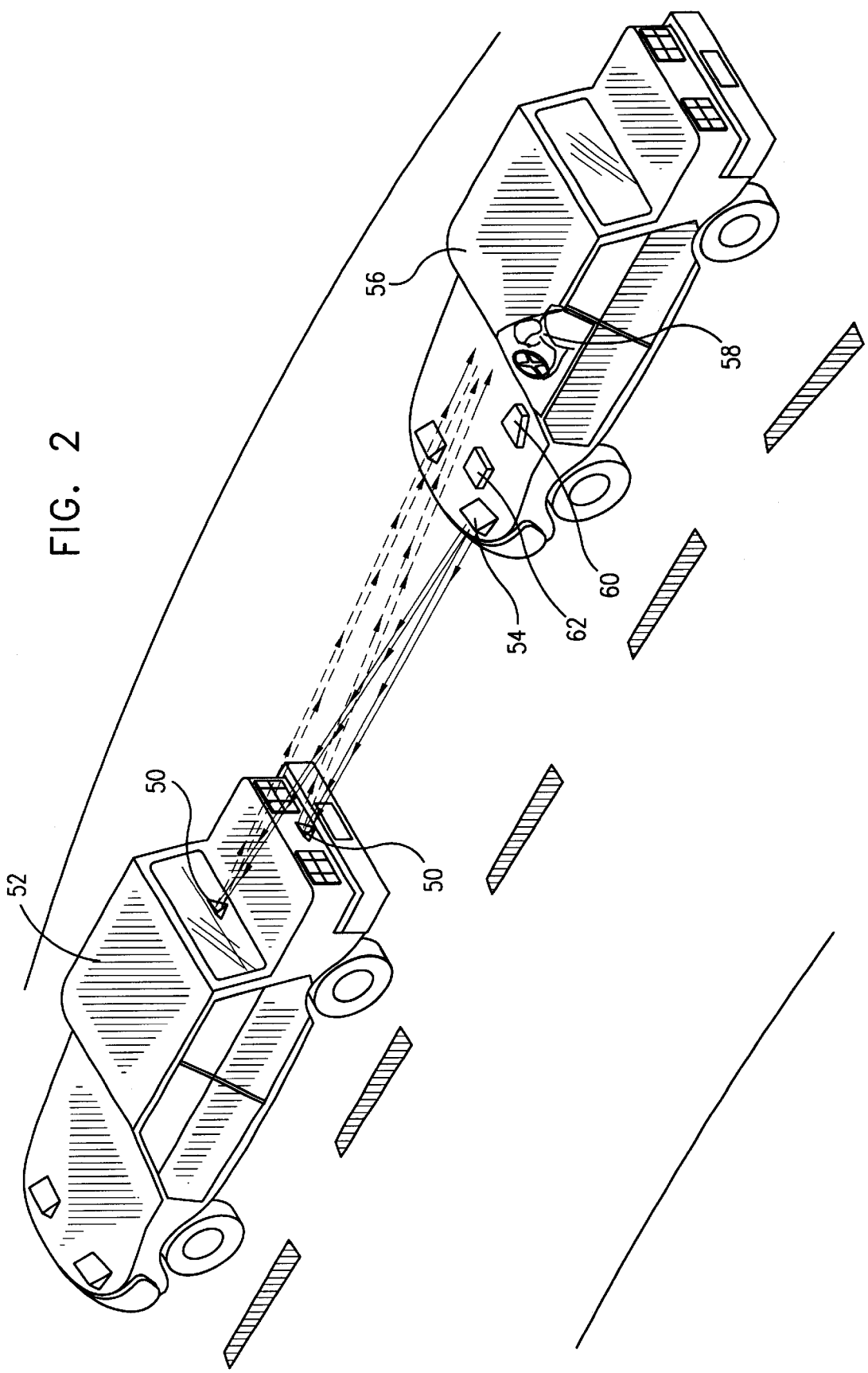
FIG. 2 is a simplified illustration of the operation of a preferred embodiment of the present invention in a situation involving trailing vehicles.
Figure 3:
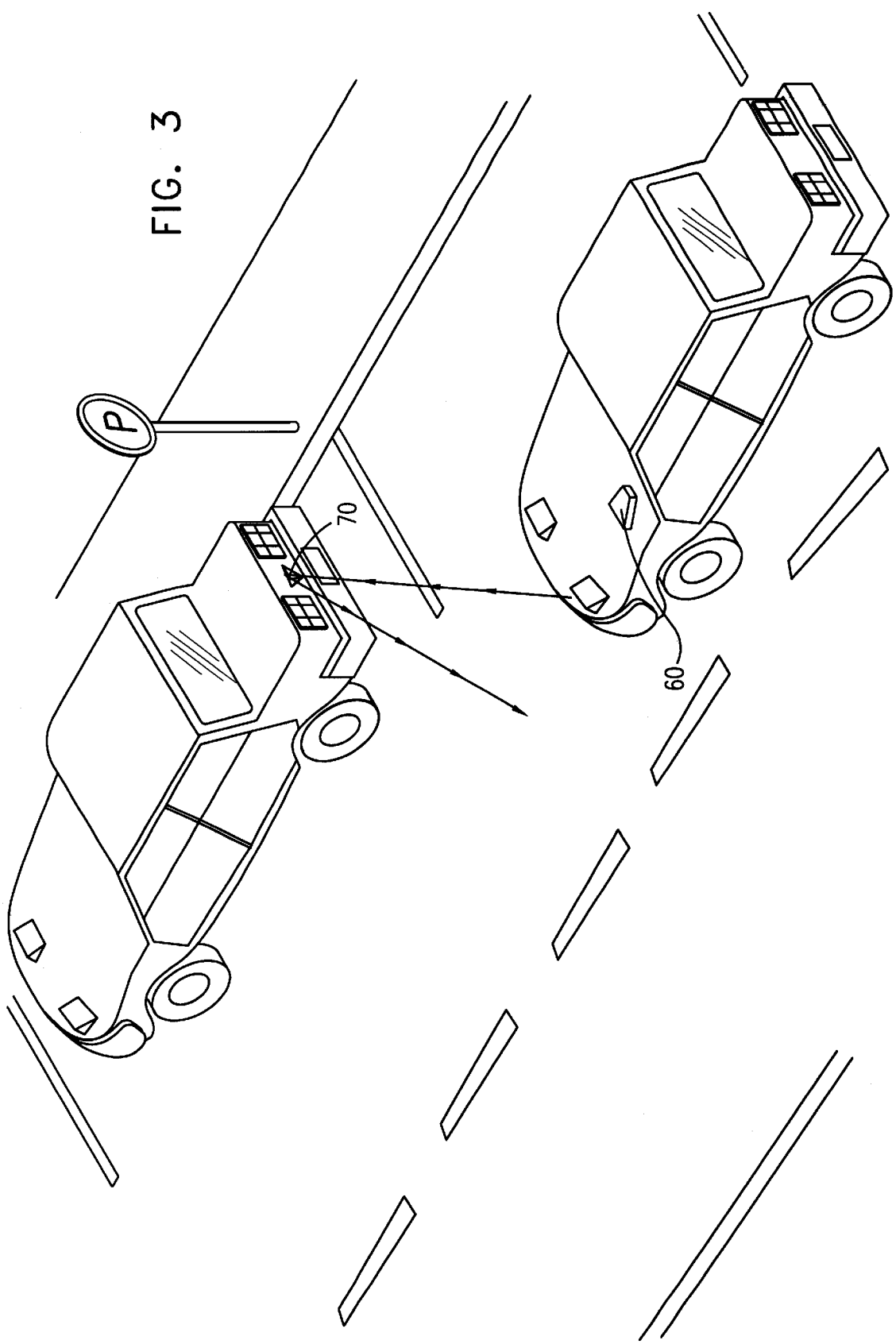
FIG. 3 is a simplified illustration of the operation of a preferred embodiment of the present invention in a situation involving a moving vehicle and a parked vehicle.

Reference is now made to FIGS. 1–3, which illustrate the operation of a preferred embodiment of the present invention in three different typical operating situations. In all three illustration, the invention is seen to comprise a vehicle mounted dynamic near-retroreflector which reflects light from the headlights of another vehicle into the eyes of the driver of that other vehicle. In an alternative embodiment of the invention, shown in each of FIGS. 1–3, the reflection provided by the vehicle mounted dynamic near-retroreflector need not be to the eyes of the driver of the other vehicle but may be alternatively or additionally to a sensor which automatically dips the headlights of the other vehicle.

The term "dynamic near-retroreflector" as used throughout the specification and claims refers to a reflecting device which produces time-varying reflection of light from a given source to a location adjacent but spaced from that source. Were the reflecting device a static retroreflector, it would reflect light from a vehicle headlight back to the vehicle headlight rather than to the eyes of the driver of the vehicle. Were the reflecting device a static near-retroreflector, it could provide a continuous reflection of light from the vehicle headlights to the vehicle driver, which would blind the driver and be dangerous. A dynamic near-retroreflector, as employed in the present invention is operative to intermittently reflect light from the vehicle headlights to the eyes of the driver. A dynamic retroreflector is operative to intermittently reflect light from the vehicle headlights to locations in a region in the vicinity of the vehicle headlights, which may include the location of the eyes of the driver. As used herein, the term "dynamic retroreflector" is deemed to include within it dynamic near-retroreflectors.

In FIG. 1, the invention is seen to comprise a generally front-facing dynamic near-retroreflector 30, mounted on the chassis of a motor vehicle 32. Dynamic near-retroreflector 30 is operative to reflect light from the headlights 34 of a facing vehicle 36 to the eyes of a driver 38 of vehicle 36 and/or to a sensor 40 which is coupled to circuitry 42. Circuitry 42 is operative to automatically dip the headlights 34 of vehicle 36 in response to a predetermined level of detection by sensor 40. Additionally or alternatively circuitry 42 may provide an indication such as a flashing light indicator or an audible sound. Alternatively, sensor 40 and circuitry 42 may be eliminated. Additionally or alternatively driver operated circuitry 433 may be provided for enabling driver 38 to control or override the operation of circuitry 42 or of the automatic headlight dipping functionality. The driver control and/or override facility may also be incorporated in all of the embodiments described hereinbelow.

In FIG. 2, the invention is seen to comprise one or more generally rear-facing dynamic near-retroreflector 50, mounted on the chassis of a motor vehicle 52. Dynamic near-retroreflector 50 is operative to reflect light from the headlights 54 of a following vehicle 56 to the eyes of a driver 58 of vehicle 56 and/or to a sensor 60 which is coupled to circuitry 62. Circuitry 62 is operative to automatically dip the headlights 54 of vehicle 56 in response to a predetermined level of detection by sensor 60. Alternatively, sensor 60 and circuitry 62 may be eliminated.

In FIG. 3, a vehicle-mounted dynamic near-retroreflector 70 is seen to have an inoperative state when the vehicle is parked, such that light impinging thereon from headlights of an adjacent vehicle is not reflected back either to the driver of the adjacent vehicle or to sensor 60. A suitable dynamic near-retroreflector having this functionality is described hereinbelow with reference to FIGS. 5A–5C, 6A and 6B.

It is to be appreciate that the functionality described hereinabove with reference to FIG. 3 is operative also with generally front-facing dynamic near-retroreflectors as illustrated in FIG. 1. It is also to be appreciated that preferably vehicles are provided with both front-facing and read facing dynamic near-retroreflectors 30 and 50.

Figure 4:
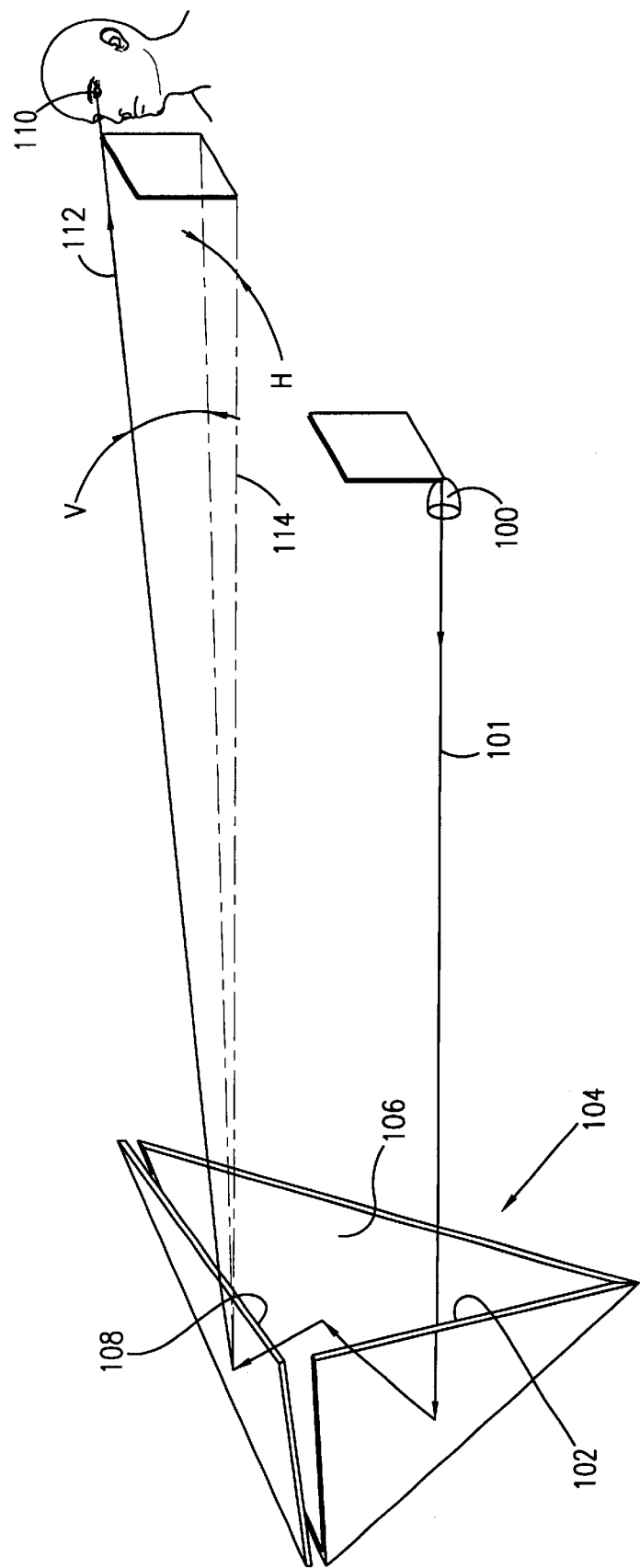
FIG. 4 is a simplified ray tracing illustration of the operation of a dynamic near-retroreflector useful in the present invention.

Reference is now made to FIG. 4, which is a simplified ray tracing illustration of the operation of a dynamic near-retroreflector useful in the present invention. It is seen that light from a light source 100, such as a vehicle headlight, typically indicated by a ray 101, impinges on one inside reflective surface, here designated 102, of a dynamic near-retroreflector 104. The light is reflected therefrom to another inside surface 106 of the dynamic near-retroreflector 104. Surface 106 is typically oriented at about but not exactly 90 degrees with respect to surface 102. The light is reflected from surface 106 to a third surface 108 of dynamic near-retroreflector 104. Surface 108 is typically oriented at about but not exactly 90 degrees with respect to surfaces 102 and 106.

According to an alternative embodiment of the invention, surfaces 102 and 106, 102 and 108 or 106 and 108 may be mutually oriented at precisely 90 degrees to each other and the remaining surface may be skewed with respect thereto in two planes, thereby providing the desired properties of near-retroreflection in two directions. Additionally or alternatively, for the embodiment illustrated in FIG. 4, the remaining surface may be skewed with respect thereto in one plane, thereby providing the desired properties of near-retroreflection in one direction. For example, the remaining surface may preferably rotate the ray 112 through the angle V or alternatively may preferably rotate the remaining surface through the angle H. It is appreciated that the term azimuth angle includes positive and negative values. Additionally, it is also appreciated that the term elevation angle includes positive and negative angles.

The light is reflected from surface 108 to a location 110, which is typically the location of the eyes of a vehicle driver and which is typically above and to the side of light source 100, but is typically in the same plane as light source 100 relative to the light ray 101 extending from the light source 100 to the retroreflector 104. It is seen that the light reflected from the dynamic near-retroreflector 104, here indicated as a single ray 112, is deflected from a theoretical retroreflected ray 114, which is parallel to ray 101, in elevation as indicated by an amount indicated by V and in azimuth by an amount as indicated by H.

In accordance with a preferred embodiment of the present invention, location 110 may be the location of the eyes of a driver of a vehicle whose headlight is represented by light source 100. Alternatively or additionally, location 110 may be the location of a light sensor (not shown), which is operatively to automatically dip the vehicle headlights.

According to an alternative embodiment of the present invention, dynamic near-retroreflector 104 may be replaced by a retroreflector and a reflected light sensor may be located at or very near to the vehicle headlights and may operate to automatically dip the vehicle headlights when reflected light therefrom is sensed thereby.

Figure 5C:
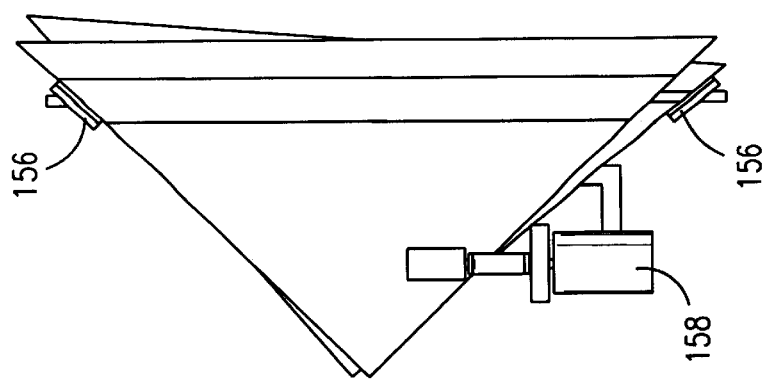
FIGS. 5A, 5B and 5C are respective pictorial, side view and top view illustrations of a scanning near-retroreflector in accordance with a preferred embodiment of the present invention.
Figure 5B:
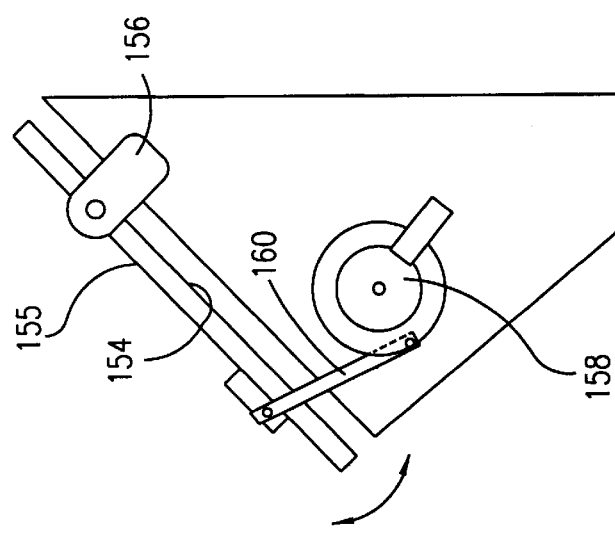
Figure 5A:
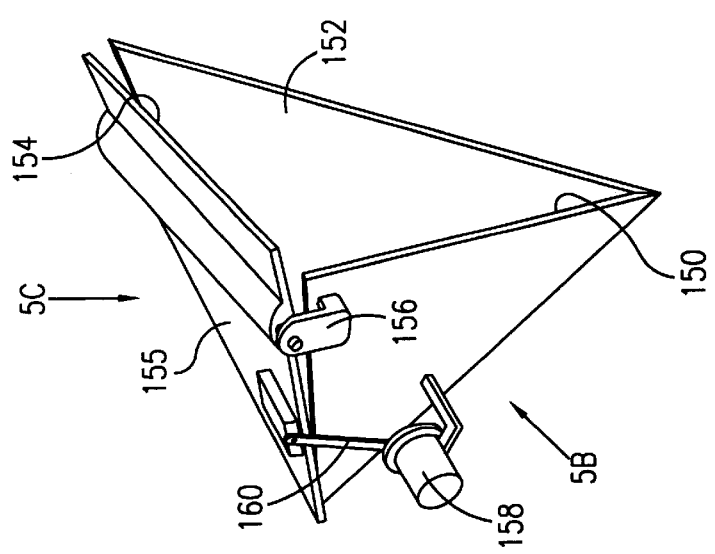

Reference is now made to FIGS. 5A, 5B and 5C, which are respective pictorial, side view and top view illustrations of a scanning near-retroreflector in accordance with a preferred embodiment of the present invention. The apparatus of FIGS. 5A, 5B and 5C is designed to provide elevational scanning of a reflected beam from the near retroreflector. This is desirable in order to accommodate a range of heights of drivers eyes or light sensors with respect to the position of the vehicle headlights and also to prevent inadvertent blinding of the driver by the reflective light, since the scanned light beam is resident at any given elevation only intermittently and momentarily.

The scanning near-retroreflector of FIGS. 5A–5C typically includes two planar elements defining reflecting surfaces 150 and 152 which are fixedly oriented with respect to each other, typically at 90 degrees or about 90 degrees. A third reflecting surface 154 is hingedly mounted onto surfaces 150 and 152 by means of a pair of hinges 156 and is periodically displaced in a periodic manner in order to provide scanning, typically at a frequency of about 1 Hz.

The illustrated embodiment of FIGS. 5A–5C illustrates a situation wherein surfaces 150 and 152 are typically mutually perpendicular and surface 154 is skewed with respect to them both in elevation and in azimuth.

In accordance with a preferred embodiment of the present invention, an active dynamic retroreflector is provided. Here the periodic displacement is produced by a scanning gear motor 158, which is preferably fixedly mounted onto one of the planar elements defining surfaces 150 and 152 and is provided with an eccentric output drive, which is coupled to surface 154, as by a rod, 160.

Figure 6B:
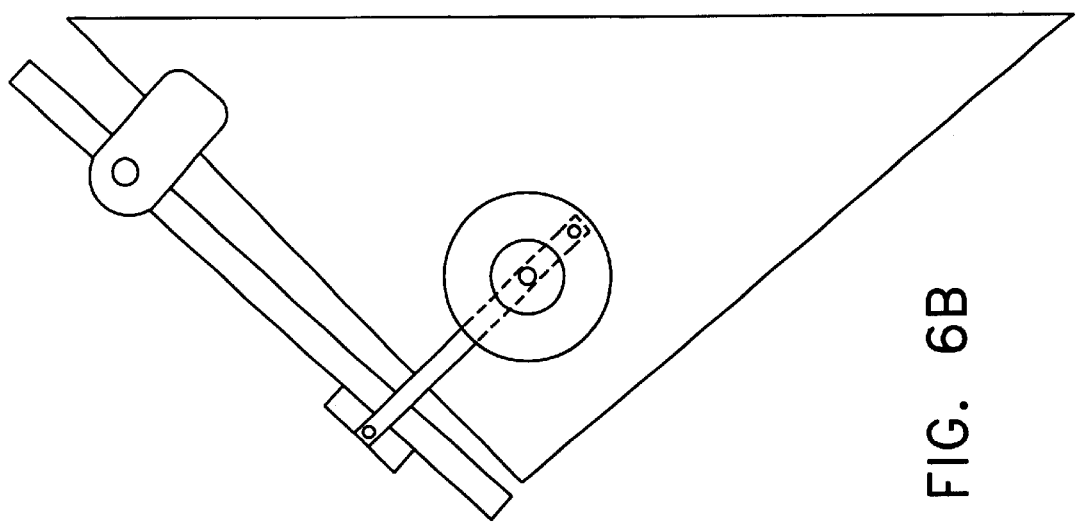
FIGS. 6A and 6B illustrate two extreme operative orientations in the scanning operation of the apparatus of FIGS. 5A, 5B & 5C.
Figure 6A:
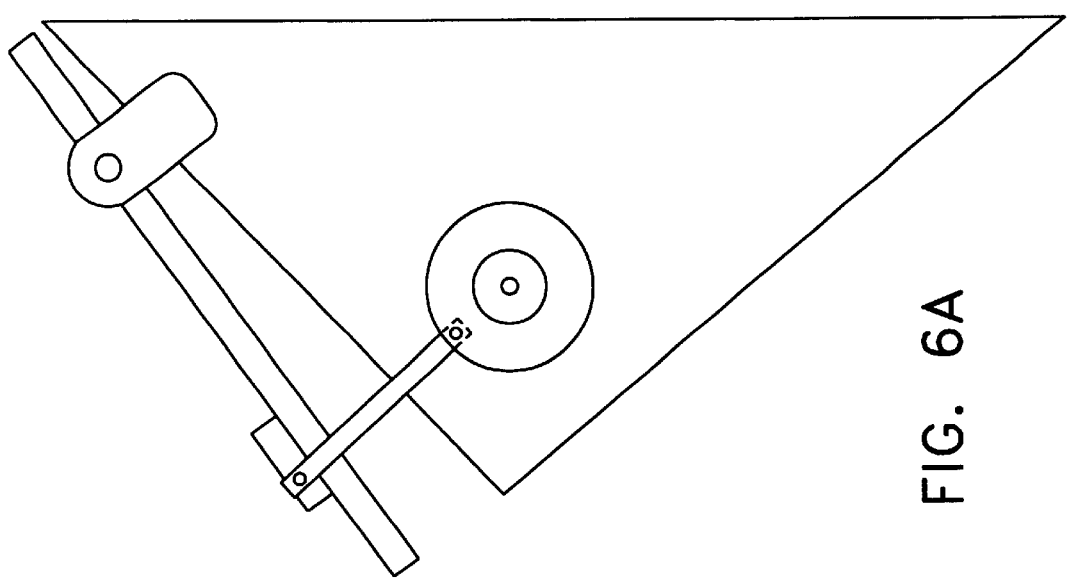

Reference is now made to FIGS. 6A and 6B, which illustrate two extreme operative orientations in the scanning operation of the apparatus of FIGS. 5A, 5B & 5C. Preferably one of the extreme orientations is employed in providing the functionality described hereinabove in connection with FIG. 3, where, when a vehicle is parked, light impinging thereon from headlights of an adjacent vehicle is not reflected back either to the driver of the adjacent vehicle or to a light sensor in that vehicle. Positioning of the apparatus of FIGS. 5A, 5B & 5C in an extreme position may be achieved through the use of a suitable rotary position encoder or microswitches (not shown).

Reference is now made to FIG. 7, which is a pictorial illustration of a scanning near-retroreflector in accordance with another preferred embodiment of the present invention. The structure of the scanning near-retroreflector is similar to that of FIGS. 5A–6B, wherein reflective surfaces 170 and 172 are fixed with respect to each other, preferably in mutually perpendicular orientation and a reflective surface 174 is scanned.

Here, however, reflective surface 174 is pivotably mounted, as by means of an axle 176 onto mounting brackets 178 attached to planar elements defining surfaces 170 and 172 and the gear motor 158 of the embodiment of FIGS. 5A–6B is replaced by a passive spring drive 180, including a coil spring 182 disposed about axle 176 and having one end fixed to axle 176 and the other to a bracket 178. A plurality of resilient bumpers 181 are provided adjacent the corners of surface 174 to absorb impact shocks during scanning.

Eccentrically mounted weights 183, fixed to axle 176 and 184, fixed to an off axle location on a planar element defining surface 174 cause rotational vibration of surface 174 relative to surfaces 170 and 172 in response to accelerations applied to weights 183 and 184 in a plane perpendicular to axle 176. When the dynamic near retroreflector of FIG. 7 is mounted on a vehicle, such accelerations normally correspond to accelerations in the direction of motion of the vehicle and in the plane of gravitational acceleration.

Figure 8:
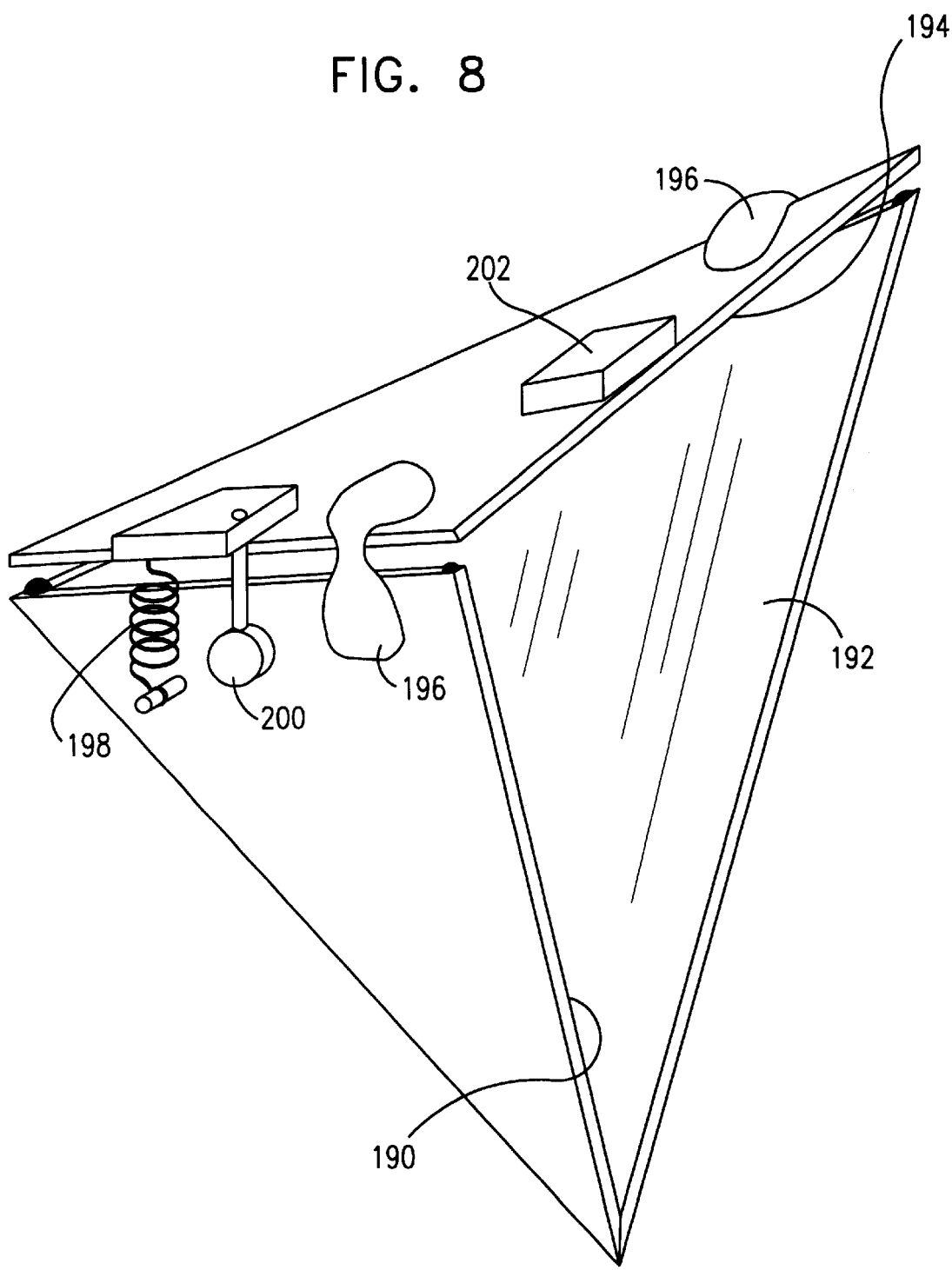
FIG. 8 is a pictorial illustration of a scanning near-retroreflector in accordance with yet another preferred embodiment of the present invention.

Reference is now made to FIG. 8, which is a pictorial illustration of a scanning near-retroreflector in accordance with yet another preferred embodiment of the present invention. The structure of the scanning near-retroreflector is similar to that of FIG. 7, wherein reflective surfaces 190 and 192 are fixed with respect to each other, preferably in mutually perpendicular orientation and a reflective surface 194 is scanned.

Here, however, reflective surface 194 is pivotably mounted, as by means of flexible and resilient hinge elements 196 which do not restrict the motion of surface 194 relative to surfaces 190 and 192 to rotation about a single axis. Hinge elements 196 are typically formed of rubber or resilient plastic. The passive spring drive 180 of FIG. 7 is replaced by an axial coil spring 198 and by the resiliency of the hinge elements 196.

The weights 182 and 184 of the embodiment of FIG. 7 are replaced by a weight 200 which is suspended from axial coil spring 198 and by a weight 202, which is eccentrically but fixedly mounted onto a planar element defining surface 194. These weights cause rotational vibration of surface 194 relative to surfaces 190 and 192 in response to accelerations applied to weights 200 and 202 in a plane generally perpendicular to that of surface 194 and in other planes as well. When the dynamic near retroreflector of FIG. 8 is mounted on a vehicle, such accelerations normally correspond to accelerations in the direction of motion of the vehicle and in the plane of gravitational acceleration.

It is appreciated that the passive embodiments of FIGS. 7 and 8 are preferably designed to produce vibration at about 1 Hz in elevation.

Figure 10:
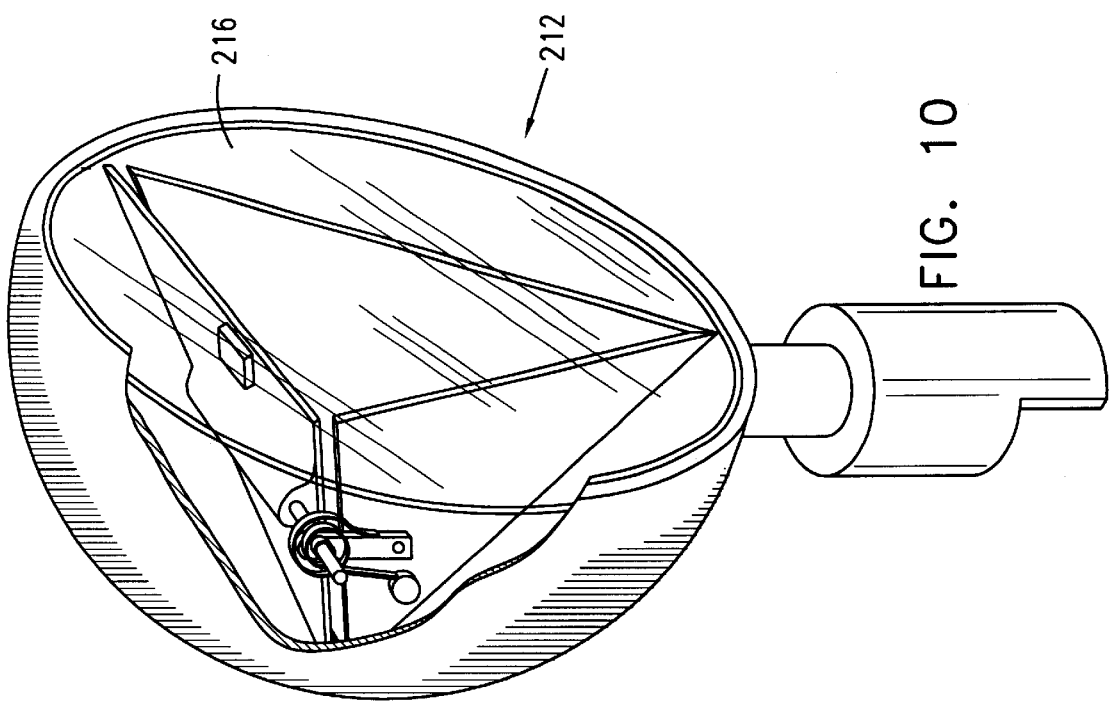
FIGS. 9 and 10 respectively illustrate the dynamic near-retroreflectors of FIGS. 5A and 7 inside sealed enclosures.
Figure 9:
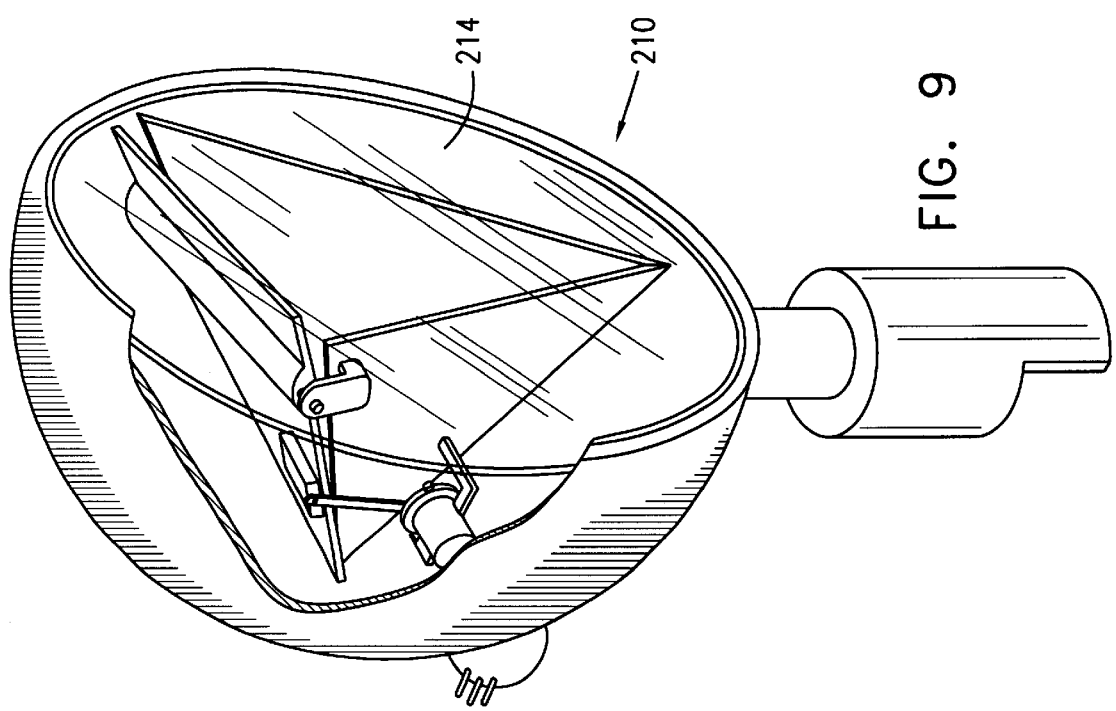

Reference is now made to FIGS. 9 and 10, which respectively illustrate the dynamic near-retroreflectors of FIGS. 5A and 7 inside sealed enclosures 210 and 212 respectively. It is a particular feature of the present invention that the front face of each enclosure preferably includes a color filter, as indicated by reference numerals 214 and 216 respectively. Alternatively, the color filter may be embodied in a suitable coating on one or more of the reflecting surfaces of the dynamic near-retroreflector. The provision of a color filter indicates clearly to a driver that he is seeing the reflection of his own headlights and not light from another source. The provision of a color filter may also be very useful when a color discriminating light sensor is employed, as in the embodiment of FIG. 19, described hereinbelow.

Figure 11:
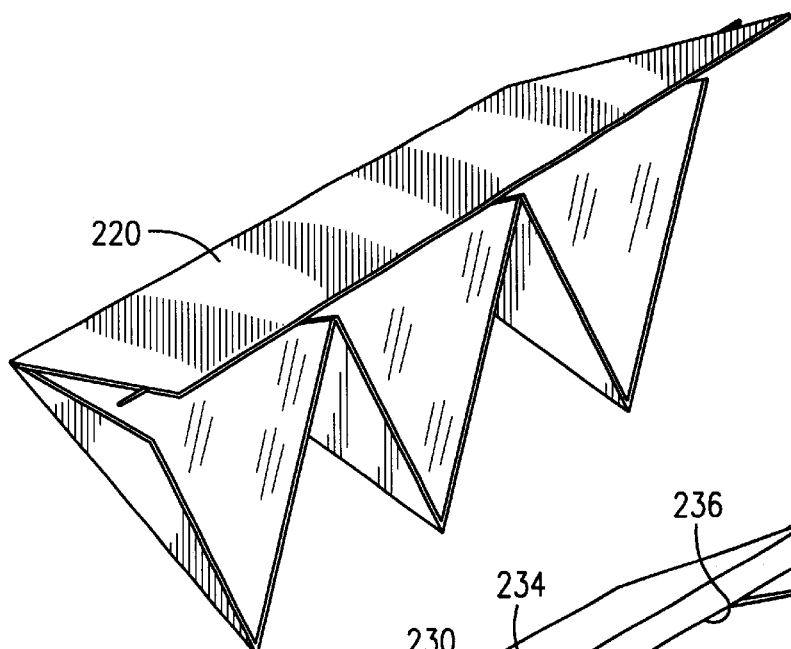
FIG. 11 is a pictorial illustration of a scanning array of near-retroreflectors constructed and operative in accordance with a preferred embodiment of the present invention.

Reference is now made to FIG. 11, which is a pictorial illustration of an array of dynamic near-retroreflectors constructed and operative in accordance with a preferred embodiment of the present invention. The array of retroreflectors can be employed instead of a single dynamic near-retroreflector in all of the embodiments described hereinabove in connection with FIGS. 1–10 and has the advantage that it provides a visually distinctive array of generally identical reflections. It is appreciated that if each of the array of retroreflectors is associated with a different color filter, a very distinctive multi-color reflected light pattern is provided to the driver. In the embodiment of FIG. 11, the array of generally identical near-retroreflectors may be provided with a common scanned surface 220.

Figure 12:
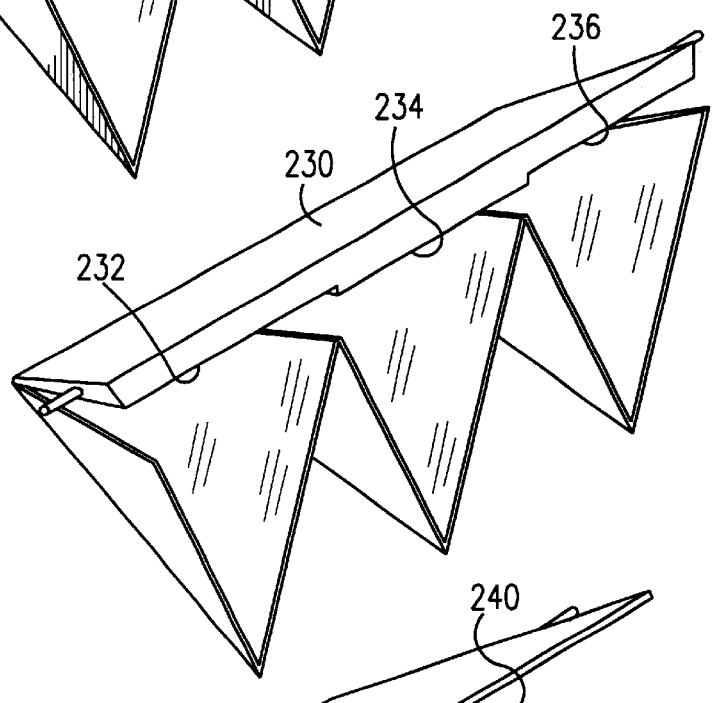
FIG. 12 is a pictorial illustration of a scanning array of near-retroreflectors constructed and operative in accordance with a preferred embodiment of the present invention.

Reference is now made to FIG. 12, which is a pictorial illustration of a scanning array of near-retroreflectors constructed and operative in accordance with a preferred embodiment of the present invention. This embodiment differs from that of FIG. 11 in that although a common top reflecting surface 230 is provided, the reflective surface portions 232, 234, and 236 thereof associated with each of the individual dynamic near-retroreflectors in the array are differently oriented. This produces scanned reflections of all individual dynamic near-retroreflectors which do not impinge on the same location at the same time. In the illustrated embodiment, reflective surface portions 232 and 236 are parallel to each other and reflective surface portion 234 is tilted with respect thereto about the axis of rotation of the top reflecting surface 230.

Figure 13:
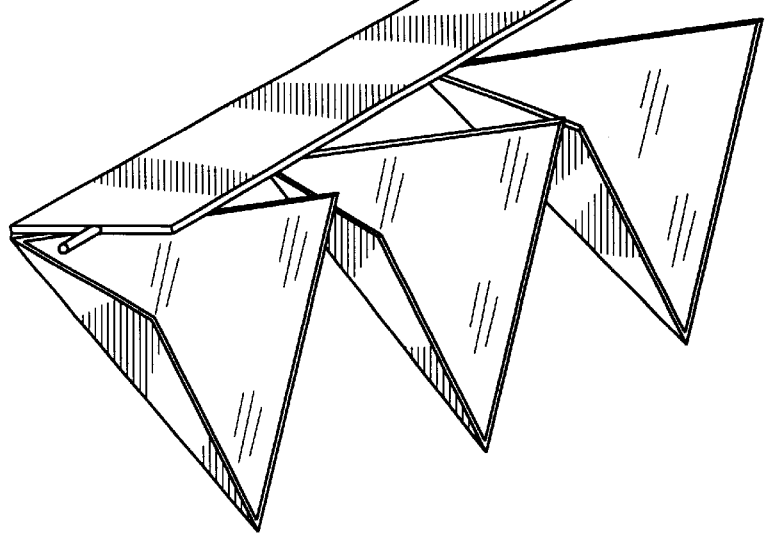
FIG. 13 is a pictorial illustration of a scanning array of near-retroreflectors constructed and operative in accordance with another preferred embodiment of the present invention.

Reference is now made to FIG. 13, which is a pictorial illustration of an array of dynamic near-retroreflectors constructed and operative in accordance with another preferred embodiment of the present invention. Here, in contrast to the embodiments of FIGS. 11 and 12, a common, uniformly oriented scanning surface 240 is provided, but each of the array of the remaining pairs of reflective surfaces of the dynamic near-retroreflectors is skewed increasingly downward with respect to the preceding pairs.

Reference is now made to FIG. 14, which is a simplified illustration of a series of images seen by a driver over time, t, when his headlights are reflected by a scanning array of near-reflectors of the type illustrated in FIG. 13, and the near-retroreflectors are typically located along an axis X. It seen that the arrangement of a common, uniformly oriented scanning surface 240 in cooperation with an array of the remaining pairs of reflective surfaces of the near-retroreflectors wherein each pair is skewed increasingly downward with respect to the preceding pairs, produces a sequential series of reflections from each of three resulting near-retroreflectors.

Reference is now FIG. 15, which is a simplified illustration of a series of images seen by a driver over time, t, when his headlights are reflected by a scanning array of near-retroreflectors of the type illustrated in FIG. 12 and the near-retroreflectors are typically located along an axis X. It is appreciated that reflections from the two side near-retroreflectors are seen at the same time, while reflections from the center retroreflector is seen separately.

Reference is now made to FIGS. 16A, 16B, 16C and 16D, which are illustrations of four typical arrangements of dynamic near-retroreflectors which may be employed in accordance wit a preferred embodiment of the present invention. It is appreciated that any suitable arrangement of any suitable number of near-retroreflectors may be employed.

Reference is now made to FIG. 17, which is a simplified illustration of a selectably mountable dynamic near-retroreflector useful in accordance with a preferred embodiment of the present invention in two operative orientations. It is seen that when oriented in a first orientation, the dynamic near-retroreflector has the same optical operation as in the embodiment of FIG. 4, as indicated by identical reference numerals. The first orientation is suitable for use with left-hand drive vehicles.

When the dynamic near-retroreflector 304 is rotated by 180 degrees about an axis 298 which passes through a vertex 299 and extends through a plane facing vertex 299 of the dynamic near-retroreflector 304, the optical operation of the dynamic near-retroreflector 304 is suitable for right-hand drive vehicles. In this orientation, it is seen that light from a light source 300, such as a vehicle headlight, indicated by a single ray 301, impinges on one inside reflective surface, here designated 302, of the dynamic near-retroreflector 304. The light is reflected therefrom to another inside surface 306 of the dynamic near-retroreflector 304. Surface 306 is typically oriented at about but not exactly 90 degrees with respect to surface 302. The light is reflected from surface 306 to a third inside surface 308 of the dynamic near-retroreflector 304. Surface 308 is typically oriented at about but not exactly 90 degrees with respect to surfaces 302 and 306.

The light is reflected from surface 308 to a location 310, which is typically the location of the eyes of a vehicle driver and which is typically above and to the side of light source 300, but is typically in the same plane as light source 300 relative to the light ray 301 extending from the light source 300 to the retroreflector 304. It is seen that the light reflected from the dynamic near-retroreflector 304, here indicated as a single ray 312, is deflected from a theoretical retroreflected ray 314, which is parallel to ray 301, in elevation as indicated by an amount indicated by V and in azimuth by an amount as indicated by H.

It is appreciated that dynamic near-retroreflectors may be realized not only with plural mirrors but also using lenses such as cats eye lenses or arrays of micromachined mirrors, which are commercially available from Texas Instruments. Combinations of retroreflectors and near-retroreflectors may also be readily realized on a single substrate.

Figure 18:
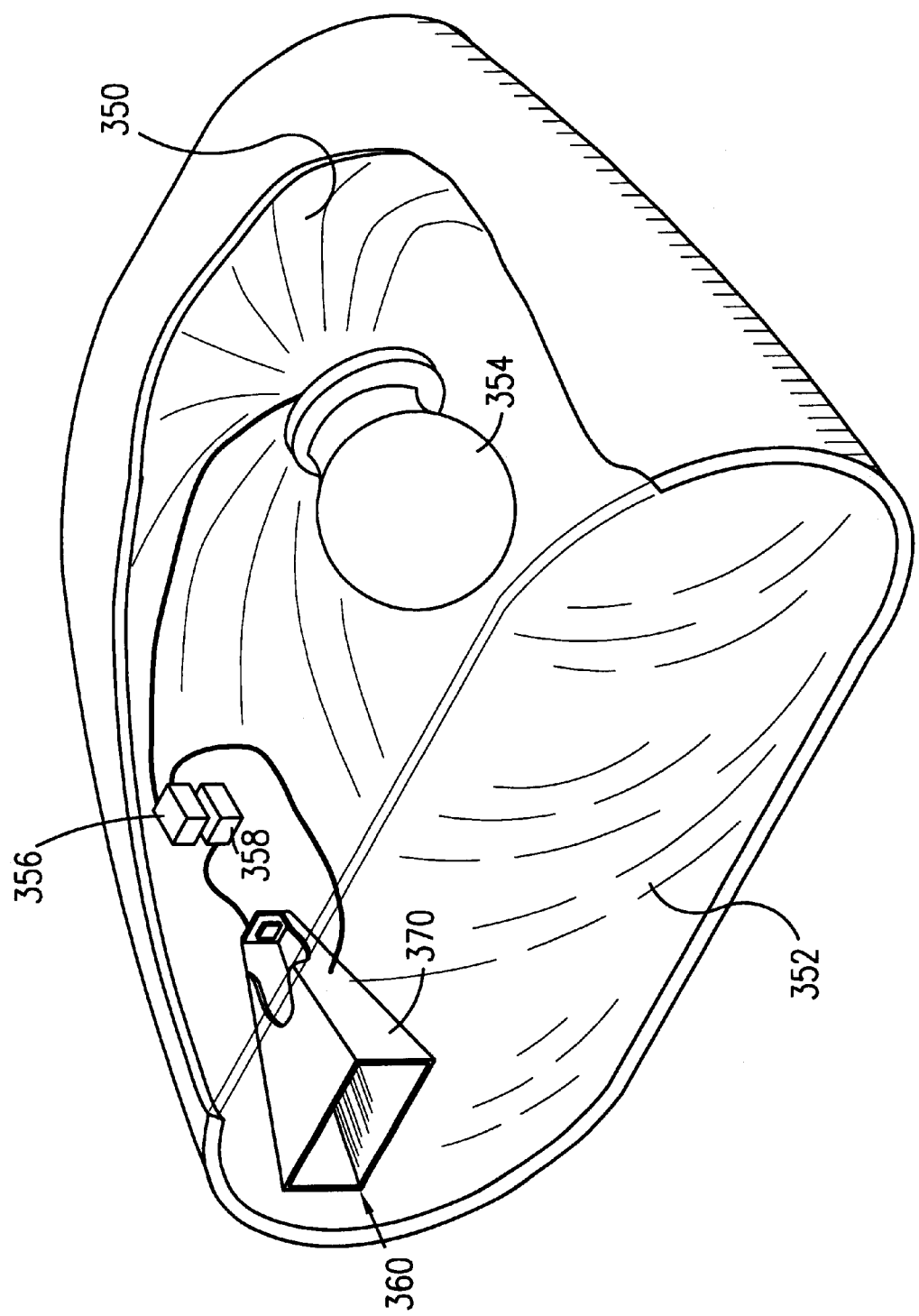
FIG. 18 is a simplified illustration of an automatically dimming vehicle headlight constructed and operative in accordance with a preferred embodiment of the present invention.

Reference is now made to FIG. 18, which is a simplified pictorial illustration of a vehicle headlight assembly constructed and operative in accordance with a preferred embodiment of the present invention. The vehicle headlight assembly of FIG. 18 comprises a generally parabolic housing 350, the inner surface of which preferably defines a reflector and the opening of which is sealed by a lens 352.

Disposed within housing 350 is one or more single or multi-level light source 354 which may be of entirely conventional construction and which is coupled to a source of electrical power, typically the vehicle battery, via a relay switch 356. The relay switch is operated by a logic circuit 358 which receives inputs from a sensor assembly 360, which is illustrated in greater detail in FIG. 19. Sensor assembly 360 is operative to sense incoming light, which may either come from the headlights of oncoming vehicles or may constitute reflections from the light source 354. Logic circuit 358 is operative to apply any suitable threshold to the output of sensor assembly 360 and to provide a headlight-dimming instruction to relay switch 356 as appropriate.

In accordance with a preferred embodiment of the invention, sensor assembly 360 is operative to specifically sense modulated reflected light originating from light source 354 which is reflected from adjacent vehicles. In such a case, logic circuit 358 is responsive to such sensed modulated reflected light to cause the relay switch 356 to temporarily lower the light level of the light source 354 in accordance with a preferred embodiment of the present invention.

The reflected light may be modulated in one or more ways. For example, it may be time modulated, as by a dynamic retroreflector, which may be identical to the dynamic near-retroreflectors described hereinabove and which may or may not be designed to provide only near-retroreflection. It is appreciated that the only difference between a dynamic retroreflector and a dynamic near-retroreflector is in the location of the center of oscillation of the scanned reflection. The scanned reflections of a dynamic retroreflector and a dynamic near-retroreflector may thus overlap but are not coextensive.

The reflected light may also be frequency or color modulated, such as by the association of a color filter with a retroreflector, as described hereinabove.

Figure 19:
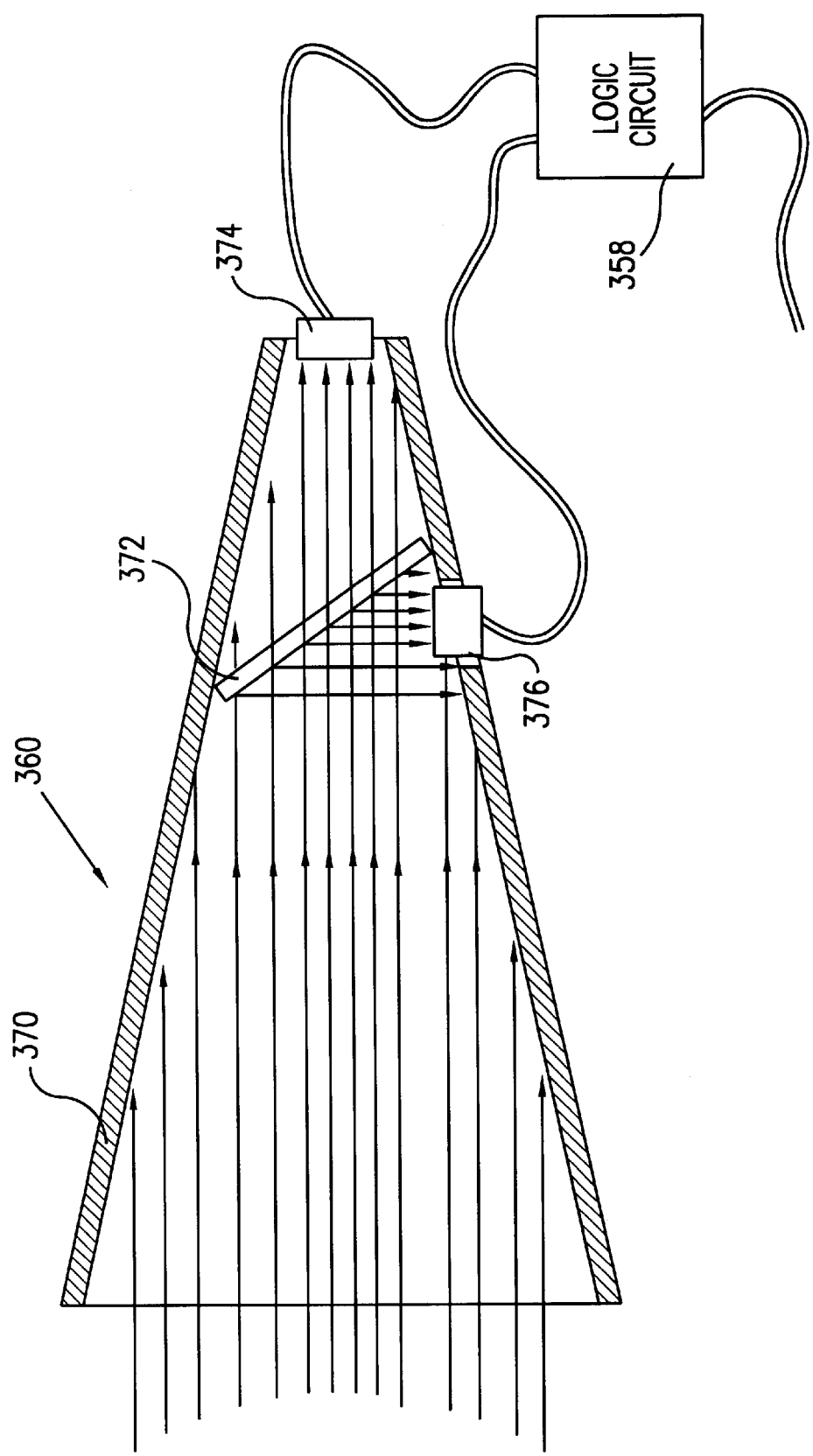
FIG. 19 is a simplified illustration of part of the automatically dimming vehicle headlight of FIG. 18 constructed and operative in accordance with a preferred embodiment of the present invention.

Referring now to FIG. 19, which illustrates a preferred embodiment of the invention employing a light filter. It is seen that the sensor assembly 360 comprises a generally horn-shaped enclosure 370 which allows entry of light through an opening thereof. A dichroic reflective beam splitter 372 is disposed inside enclosure 370 and is operative to direct light of a given color to a first light sensor 374 and all other light to a second light sensor 376.

The outputs of light sensors 374 and 376 are supplied to the logic circuit 358 which subtracts the outputs of the two sensors and filters out output signals which do not meet other predetermined modulation and threshold criteria, thereby to provide a logic circuit output signal which indicates received reflection from light source 354 to an acceptable degree of accuracy. This logic circuit output signal is employed as a control signal by relay switch 356.

It is appreciated that the logic circuit 358 may be responsive not only to sensed reflections from light source 354 but also to sensed light inputs from oncoming vehicles of sufficiently high intensity.

Figure 20:
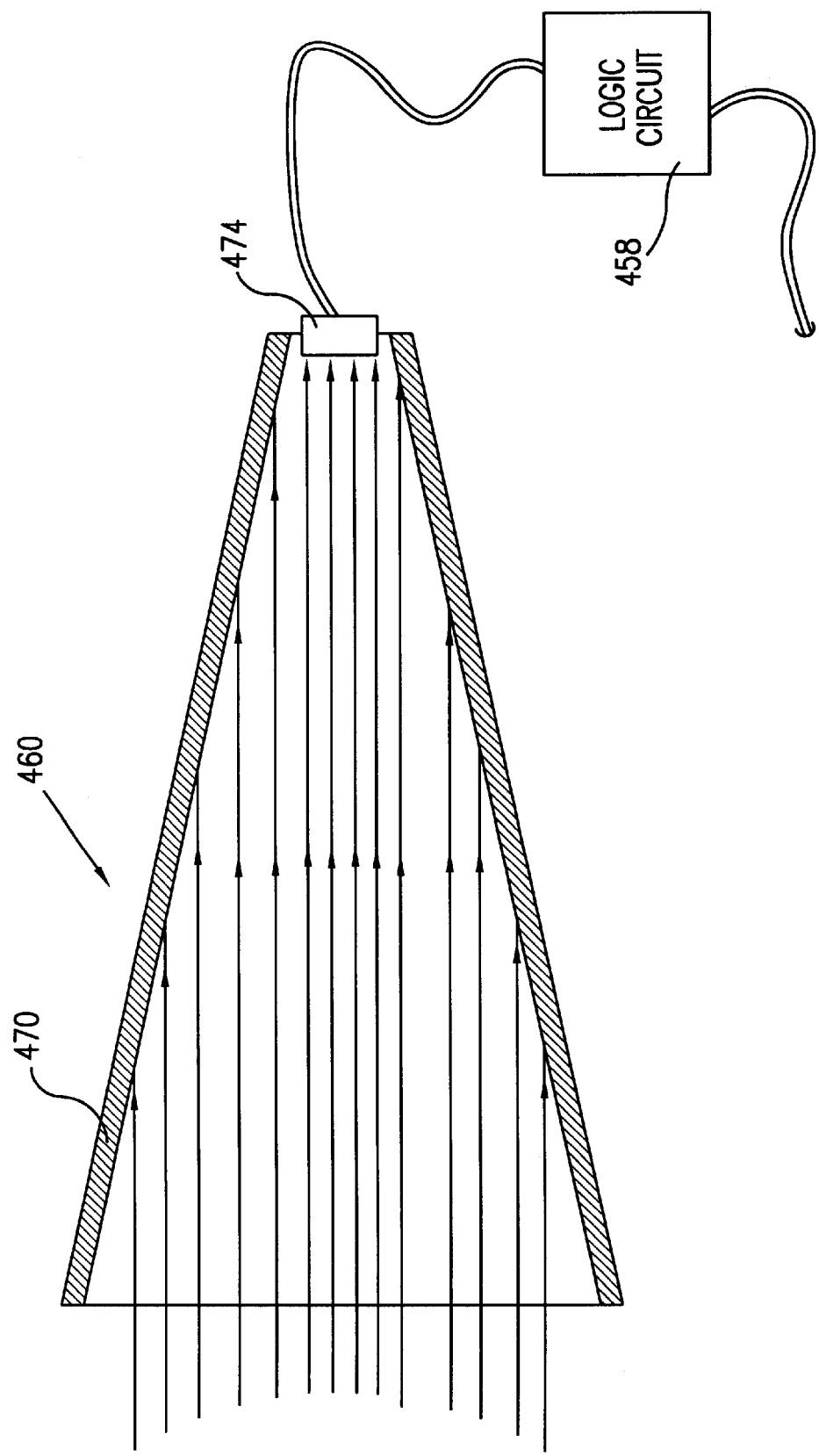
FIG. 20 is a simplified illustration of part of another embodiment of the automatically dimming vehicle headlight of FIG. 18 constructed and operative in accordance with a preferred embodiment of the present invention.

Reference is now made to FIG. 20, which illustrates the embodiment of FIG. 18 in which the sensor assembly 360 and the logic circuit 358 are replaced by a sensor assembly 460 and a logic circuit 458. The sensor assembly 460 includes a light sensor 474 and a generally horn-shaped enclosure 470.

The output of the light sensor 474 is supplied to the logic circuit 478 which filters out output signals which do not meet other predetermined modulation and threshold criteria, thereby to provide a logic circuit output signal which indicates received reflection from light source 354 to an acceptable degree of accuracy. This logic circuit output signal is employed as a control signal by relay switch 356.

It is appreciated that the logic circuit 458 may be responsive not only to sensed reflections from light source 354 but also to sensed light inputs from oncoming vehicles of sufficiently high intensity.

In accordance with a preferred embodiment of the present invention, the automatically dimming headlight arrangement described hereinabove may operate independently for each headlight and may be plug compatible with conventional headlights so as to require little or no installation, other than possibly for a driver override facility. Alternatively, the light sensor and logic circuitry in one headlight may be connected to control the brightness of another conventional headlight. As a further alternative, the light sensor and/or logic circuitry may be external of the headlight.

It is further appreciated that when the light sensor is located at or near the headlight of a vehicle and there is no need or desire to provide reflections of the headlight to the vehicle driver, a retroreflector as opposed to a near-retroreflector may be used in the system.

It will be apparent to persons skilled in the art that the present invention is not limited to what has been particularly shown and described hereinabove. Rather the scope of the present invention is defined only by the claims which follow:

What is claimed is:

1. Apparatus for informing a driver of a first vehicle that his headlights are blinding the driver of another vehicle comprising:

a dynamic retroreflector mounted on the other vehicle and arranged such that light from the headlights of the first vehicle is reflected by the dynamic retroreflector to the eyes of the drive of the first vehicle.

2. Apparatus according to claim 1 and wherein the dynamic retroreflector comprises at least one reflecting surface arranged to reflect received light from a headlight to a location located to the side and vertically of the headlight.

3. Apparatus according to claim 1 and wherein said dynamic retroreflector is oriented in an orientation for reflecting light to a vehicle with a left-hand drive.

4. Apparatus according to claim 1 and wherein said dynamic retroreflector is oriented in an orientation for reflecting light to a vehicle with a right-hand drive.

5. Apparatus according to claim 1 and wherein the dynamic retroreflector comprises at least one reflecting surface arranged to reflect received light from a headlight to a location located to a direction relative to the headlight.

6. Apparatus according to claim 1 and wherein said apparatus is operative to provide a time-modulated light reflection to said driver.

7. Apparatus according to claim 1 and wherein the dynamic retroreflector includes plural reflecting surfaces which are non-fixedly mounted with respect to each other.

8. Apparatus according to claim 1 and wherein said dynamic retroreflector comprises a dynamic near-retroreflector.

9. A road vehicle assembly including apparatus for informing a driver of an other vehicle that his headlights are blinding the driver of the road vehicle, the road vehicle assembly comprising:

a chassis;

a drive train;

a dynamic retroreflector mounted on the chassis and arranged such that light from the headlights of said other vehicle is reflected by the dynamic retroreflector to the eyes of the driver of said other vehicle.

10. Apparatus according to claim 9 and wherein the dynamic retroreflector comprises at least one reflecting surface arranged to reflect received light from a headlight to a location located to the side and vertically of the headlight.

11. Apparatus according to claim 9 and wherein said dynamic retroreflector is oriented in a first orientation for reflecting light to a vehicle with a left-hand drive.

12. Apparatus according to claim 9 and wherein said dynamic retroreflector is oriented in a second orientation for reflecting light to a vehicle with a right-hand drive.

13. Apparatus according to claim 9 and wherein the dynamic retroreflector comprises at least one reflecting surface arranged to reflect received light from a headlight to a location located to a direction relative to the headlight.

14. Apparatus according to claim 9 and wherein said apparatus is operative to provide a time-modulated light reflection to said driver.

15. Apparatus according to claim 9 and wherein the dynamic retroreflector includes plural reflecting surfaces which are non-fixedly mounted with respect to each other.

16. Apparatus according to claim 9 and wherein said dynamic retroreflector comprises a dynamic near-retroreflector.

17. Apparatus for informing a driver of a first vehicle that his headlights are blinding the driver of another vehicle, said apparatus comprising:

a modulator-reflector mounted on the other vehicle and arranged to reflect light from the headlights of the first vehicle back towards the first vehicle in a modulated form.

18. Apparatus according to claim 17 and also comprising:

a modulated light sensor mounted on the first vehicle and being operative to distinguish light reflected from the headlights of the first vehicle by virtue of its modulated form and to provide an output indication of receipt of light reflected from the headlights of the first vehicle; and an automatic headlight brightness controller responsive to the output indication for lowering the brightness of the headlights of the first vehicle.

19. Apparatus according to claim 18 and wherein at least one of said modulated light sensor and said brightness controller are incorporated within a vehicle headlight.

20. Apparatus according to claim 18 and wherein said modulated light sensor and said brightness controller are incorporated within a vehicle headlight.

21. Apparatus according to claim 18 and wherein said modulator-reflector comprises a dynamic near-retroreflector.

22. Apparatus according to claim 21 and wherein said modulator-reflector comprises a vibrating device.

23. Apparatus according to claim 21 and wherein said modulator-reflector provides at lest one of color and amplitude modulation.

24. Apparatus according to claim 21 and wherein said modulator-reflector provides both color and amplitude modulation.

25. Apparatus according to claim 21 and wherein said modulator-reflector comprises a passive device.

26. Apparatus according to claim 21 and wherein said modulator-reflector comprises an active device.

27. Apparatus according to claim 18 and wherein said modulator-reflector comprises a vibrating device.

28. Apparatus according to claim 18 and wherein said modulator-reflector provides at least one of color and amplitude modulation.

29. Apparatus according to claim 18 and wherein said modulator-reflector provides both color and amplitude modulation.

30. Apparatus according to claim 18 wherein said modulator-reflector comprises a passive device.

31. Apparatus according to claim 18 and wherein said modulator-reflector comprises an active device.

* * * * *

UNITED STATES PATENT AND TRADEMARK OFFICE
CERTIFICATE OF CORRECTION

PATENT NO. : 6,275,145 B1 Page 1 of 1
DATED : August 14, 2001
INVENTOR(S) : Joseph Rogozinski It is certified that error appears in the above-identified patent and that said Letters Patent is hereby corrected as shown below:

Column 1,
Line 19, "5,345,261." should read -- 5,347,261. --;

Column 4,
Line 14, "would" should read -- could --;
Line 36, "433" should read -- 43 --;
Line 58, "appreciate" should read -- appreciated --;
Line 62, "read facing" should read -- rear facing --;

Column 8,
Line 9, "near-reflectors" should read -- near-retroreflectors --;
Line 29, "wit" should read -- with --;

Column 10,
Line 52, "drive" should read -- driver --;

Column 11,
Line 28, "a second orientation" should read -- an orientation --; and Column 12,
Line 22, "lest" should read -- least --.

Signed and Sealed this

Twenty-second Day of October, 2002

Attest:

Attesting Officer

JAMES E. ROGAN
Director of the United States Patent and Trademark Office